J. ECKHARD.
CONTROLLING DEVICE FOR AUTOMOBILES.
APPLICATION FILED APR. 2, 1909.
982,177.
Patented Jan. 17, 1911.
2 SHEETS—SHEET 1.
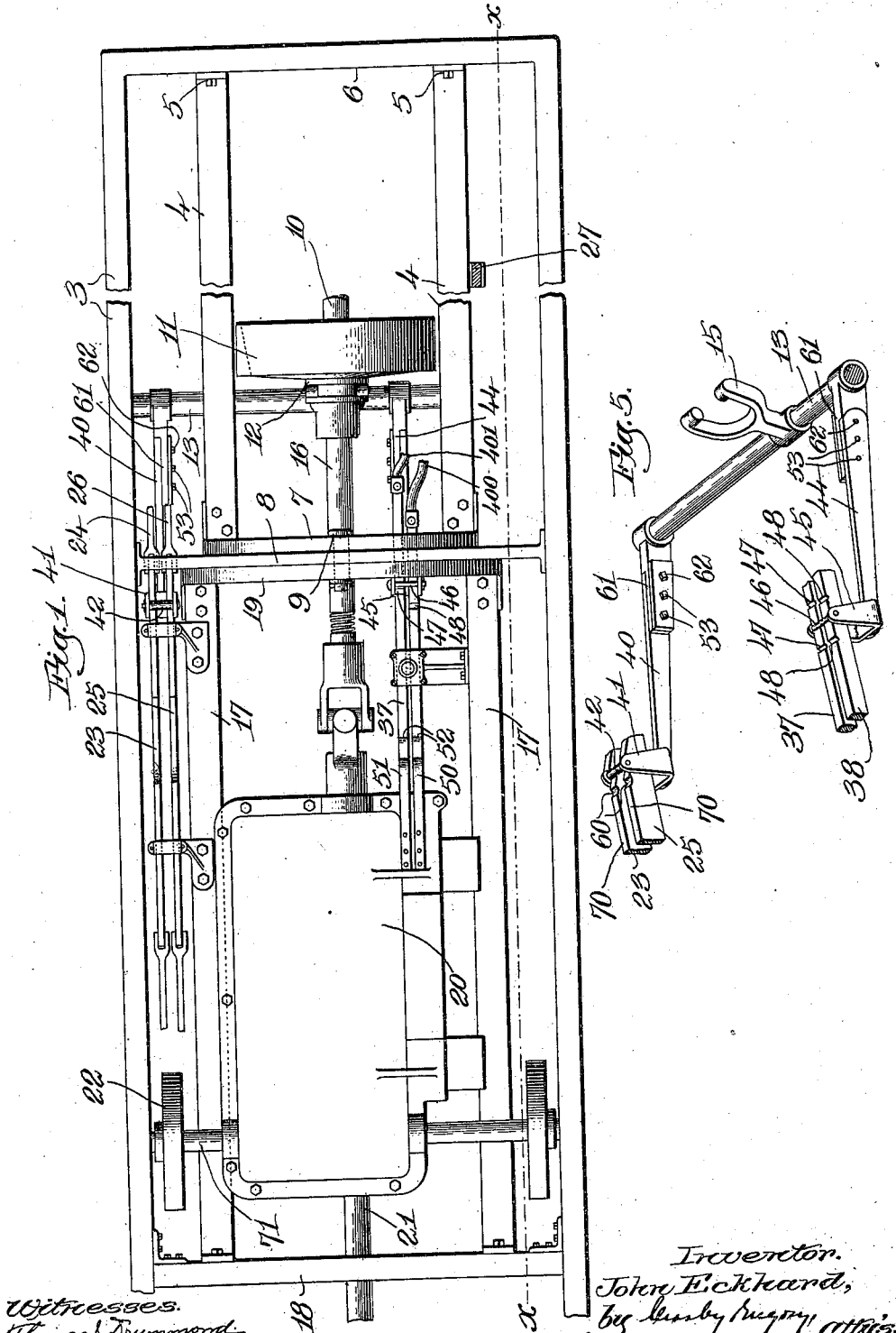

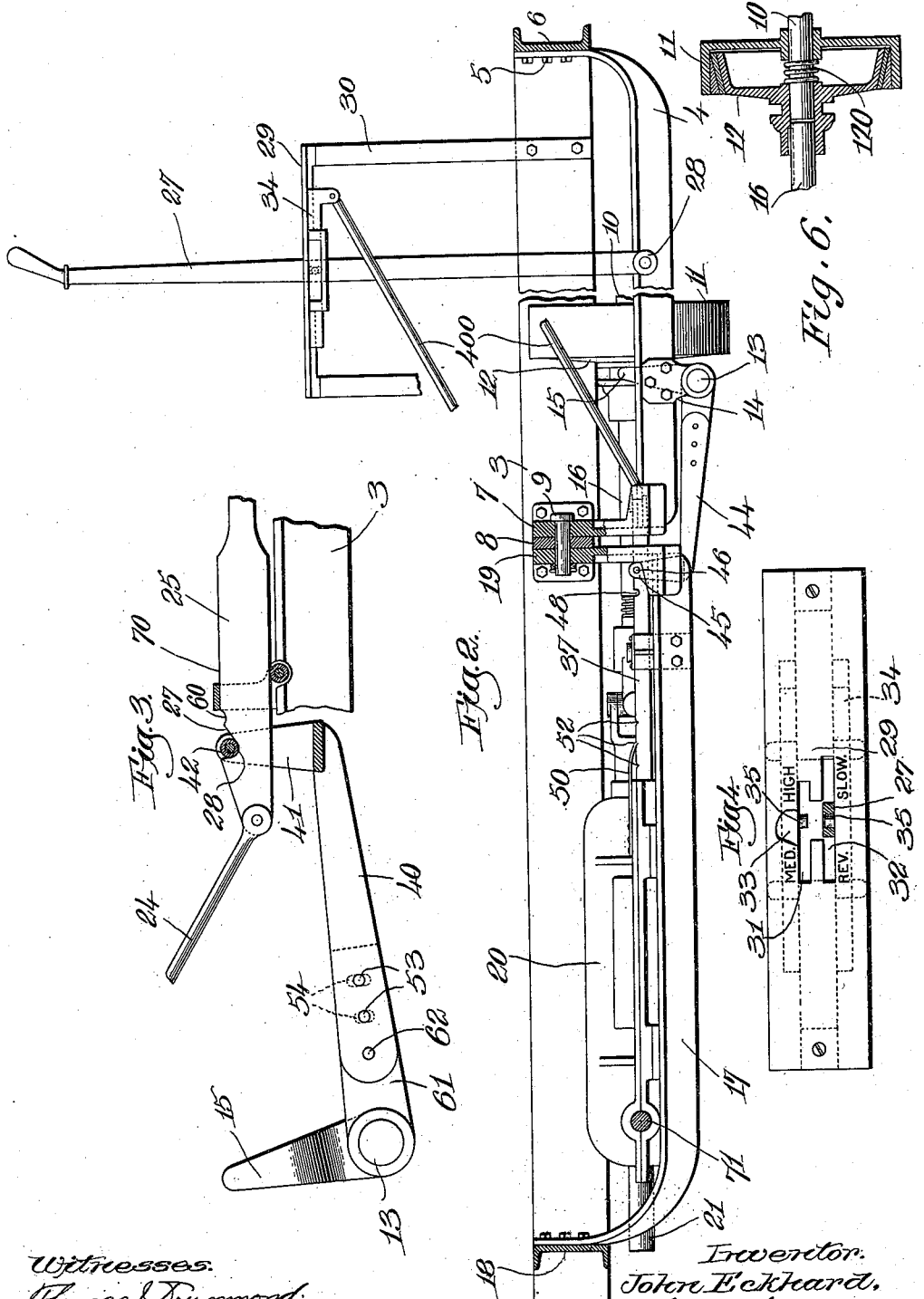

UNITED STATES PATENT OFFICE.

JOHN ECKHARD, OF BOSTON, MASSACHUSETTS.

CONTROLLING DEVICE FOR AUTOMOBILES.

982,177. Specification of Letters Patent. Patented Jan. 17, 1911.

Application filed April 2, 1909. Serial No. 487,492.

*To all whom it may concern:*

Be it known that I, JOHN ECKHARD, a citizen of the United States, residing at Boston, county of Suffolk, and State of Massachusetts, have invented an Improvement in Controlling Devices for Automobiles, of which the following description, in connection with the accompanying drawing, is a specification, like letters on the drawing representing like parts.

This invention relates to controlling devices for automobiles and has for its object to provide a novel interlocking connection between the clutch-operating mechanism and the brake-operating mechanism whereby the operation of setting the brake will automatically disengage the clutch, and still further to provide a novel manner of mounting the reversing lever and the slides connected therewith so that the parts will work freely regardless of the relative positions of the motor-supporting frame and the transmission-supporting frame.

I will first describe one embodiment of my invention and then point out the novel features thereof in the appended claims.

In the drawings, Figure 1 is a plan view of a portion of the chassis of an automobile showing the motor-supporting frame and the transmission-supporting frame, and also showing the interlocking connection between the clutch-operating mechanism and both the brake-operating mechanism and the reversing mechanism; Fig. 2 is a section on the line *x—x*, Fig. 1; Fig. 3 is an enlarged detail view of the interlocking connection between the brake actuator and the clutch actuator; Fig. 4 is a plan view of the grid or H by which the position of the reversing lever is controlled; Fig. 5 is a detail perspective view of the clutch actuator and the actuators for the brakes and gears of the transmission. Fig. 6 is a detail sectional view of the spring clutch.

The main or chassis frame is shown at 3 and it may have any suitable or usual construction. It is herein shown as being provided with an auxiliary motor-supporting frame comprising the two side sills 4 which are rigidly secured at 5 to the cross sills 6 of the chassis frame and which are also secured to the yoke 7 that is pivotally mounted at 9 to a cross sill 8 of the chassis frame. The main frame also has associated therewith an auxiliary transmission-supporting frame comprising the two side sills 17 both of which are rigidly secured at one end to the cross sill 18 and which are secured at the other end to the yoke 19 that is also pivoted at 9 to the cross sill 8. The auxiliary motor-supporting frame is designed to sustain the motor (not shown) which is connected to and which drives the motor shaft 10. This shaft is connected to a driving shaft 16 by means of a spring-controlled friction clutch of some suitable construction and the shaft 16 leads to the transmission gearing which is housed in the gear casing 20 and which may be of any suitable or usual construction. The transmission gearing drives the shaft 21 which leads to the differential gear or to the driving axle. The spring-controlled friction clutch may be of any appropriate construction and is herein shown as comprising the two friction clutch members 11 and 12 and a spring 120 which tends normally to throw the clutch members into frictional engagement with each other. The clutch is disengaged by moving the clutch member 12 to the right, Figs. 1 and 6, against the action of the spring 120, and this movement of the clutch member 12 is secured by means of a clutch actuator herein shown as a rock-shaft 13 journaled in bearings 14 sustained by the motor-sustaining frame and having a yoke 15 thereon which engages a groove in the hub of the clutch member whereby rocking movement of the rock-shaft 13 will move the yoke and clutch member to the right, Figs. 1 and 6, thereby causing disengagement of the clutch. When the clutch actuator is released the spring 120 will act automatically to throw the clutch members into engagement.

I make no claim herein to the particular manner of supporting the motor and transmission gearing on the auxiliary frame as this has been made the subject of a separate application filed by me July 12, 1909, Se. No. 507,081, which application has been divided out from this present application.

The transmission gearing may be of any suitable type and further illustration thereof is not deemed to be necessary herein, but it might be stated that this transmission gearing is shown as having associated therewith the cross shaft 71 carrying the usual brake drum 22 which is encircled by a strap brake (not shown) in the usual manner. This brake, which is associated with the transmission, is that which is commonly employed for braking the car and it is operated by a brake actuator 23 of usual construction which in turn is connected by means of a link 24 with the usual pedal (not shown) by which the brake is actuated. It is customary to provide automobiles with an additional or emergency brake which is associated with one or both of the rear wheels, and it is common to operate this emergency brake by means of another pedal which is connected thereto by another actuator. Since an emergency brake of this type and its actuating mechanism is quite common, I have not deemed it necessary to illustrate it herein, but I have shown at 25 an actuator for actuating the emergency brake, which actuator is connected by the link 26 with a suitable treadle (not shown).

The transmission is adjusted for different speeds in the usual manner by means of an operating lever 270. This lever is shown as pivoted to the motor-supporting frame at 280 and as extending up through the usual grid or H 29 by which the movements of the lever are controlled. This grid or H is sustained by a frame 30 rising from the main or chassis frame and it is provided with the usual two slots 31 and 32 which are connected with each other and into either one of which the operating lever 270 may be carried. Associated with the grid are the two slides 33 and 34 each having the projection 35 extending therefrom which is adapted to be received in an aperture in the controlling lever 270. The two slides 33 and 34 are connected to two actuators 37 and 38 which are commonly employed for adjusting or setting the transmission at the desired speed, the actuator 37 being that which shifts the transmission from high to medium speed, and vice versa, and the actuator 38 being that which adjusts the transmission for a slow speed or controls the reversing mechanism. The actuators are connected to the slides 33 and 34 by means of links 400 and 401 which are pivoted to both the slides and the actuators.

One feature of my invention relates to an interlocking connection between the brake actuators and the clutch actuator and to a novel lock for the transmission mechanism which is automatically released when the clutch is disengaged. As herein shown the clutch-actuating shaft 13 is provided with an arm 40 having an extension 41 that carries a roll 42 adapted to engage the upper side of the brake actuators 23 and 25. Each actuator is provided with a notch 28 having an inclined surface 27. When the brakes are in their normal condition the roll 42 rests in the notches 28. When, however, either actuator is moved to the right Figs. 1 and 5, or to the left Fig. 3, the cam surface 27 by its engagement with the roll 42 raises the arm 40 and turns the clutch-operating shaft 13 sufficiently to disengage the clutch against the action of the clutch spring 120. When, therefore, either brake is operated, the clutch will be disengaged automatically during the first movement of the brake actuator. The operation of setting the brake, however, usually requires a somewhat greater movement of the corresponding brake actuator than is necessary to disengage the clutch, and it will be noted from Figs. 3 and 5 that as soon as either clutch actuator has been moved sufficiently to carry the roll 42 onto the straight upper edge 70 thereof, then said actuator can be moved as much farther as is necessary to properly set the brake without giving any movement to the clutch actuator. It will be understood that the clutch spring 120 tends normally to throw the clutch into engagement and that in the usual construction it is necessary to hold the clutch disengaged against the pressure of the spring. With my improvement, however, when the brake is applied the pressure of the clutch spring 120 will be taken entirely by the flat portion 70 of the brake actuator and such pressure will, therefore, be entirely removed from the hand of the operator. This I regard as of decided advantage. Another advantage of the construction is that although the clutch spring does offer a resistance to the initial movement of the brake actuator, yet after said actuator has been moved sufficiently to carry the roll onto the flat surface 70 of the brake actuator, the clutch spring will offer no further resistance to any added movement of the brake actuator. I may if desired provide each brake actuator with a notch 60 with which the roll 42 will have engagement as the brake actuator is used. This is of advantage because if it is desired to release the clutch without applying the brake, the operator will merely move the brake actuator until the roll 42 comes into the notch 60. The rock-shaft 13 has connected thereto and extending therefrom another arm 44 provided with an extension 45 which carries a pin 46 that overlies the upper edge of the actuators 37, 38. These actuators have notches 47 and 48 therein in which the pin 46 is adapted to be received, said pin thus acting as a lock to prevent movement of the actuators. Whenever the clutch actuator 13 is operated to disengage the clutch, however, the arm 44 is elevated thereby lifting the pin 46 out of the notches 47 and 48 and unlocking the actuators 37, 38, so that the transmission may be adjusted. Each actuator 37, 38 is provided with several of these notches in its upper edge properly situated so that whenever the clutch is engaged said actuators will be properly locked. In addition to this locking means I have provided a tell-tale arrangement which indicates to the operator when the actuators are in proper position for any given speed.

In the ordinary construction the operator cannot always tell whether the gears of the transmission are properly or completely in mesh with each other, and as a result he is required to adjust the controlling lever 27 according to his best judgment. With my invention, however, the tell-tale device indicates definitely to the operator when the transmission gears are adjusted as desired. This tell-tale arrangement is herein shown as in the form of two comparatively stiff springs 50 and 51 which are adapted to engage notches 52 formed in the upper edge of the actuators. As the actuators are moved to adjust the transmission the springs snap into one or the other of the notches 52 and because said springs are comparatively stiff, the operator can feel this movement and can, therefore, easily tell when the actuators are properly positioned to cause the gears of the transmission to be properly in mesh.

From the above it will be seen that there is an interlocking connection between the actuators for the transmission and the clutch and another interlocking connection between the actuators for the brakes and the clutch, so that whenever the brakes are operated the clutch will be thrown out of operation, and whenever the clutch is thrown out of operation the actuators for the transmission are unlocked. It will thus be impossible either to shift or adjust the transmission or to apply the brakes when the clutch is in operation. This is a decided advantage because if the speed is changed when the clutch is in operation the teeth of the transmission gears are very apt to be stripped and where movements of two independent levers are necessary to disengage the clutch and adjust the transmission, the operator is liable by mistake to shift the transmission before disengaging the clutch.

I will preferably make the walls of the slots 47, 48 tapering so that if either actuator 37, 38 is not properly positioned the movement of the pin 46 into the slot will correctly position said actuator thereby to bring the gears of the transmission properly into mesh.

It will be understood, of course, that the clutch actuator 13 is controlled as to its movement in one direction by the usual clutch spring which I have not deemed it necessary to show herein.

From the above it will be seen that the transmission and the motor are supported on two separate auxiliary frames, each of which is flexibly connected to the main chassis frame, and as a result whenever the main chassis frame is twisted in any way, as would result if one wheel of the automobile ran over an obstruction, the auxiliary frames 4 and 17 can give sufficiently so that no injurious strain will be brought on the motor, transmission or driving shaft. It will be further seen that although the actuators for the brake and for the transmission are sustained by the transmission-supporting frame while the slides 33 and 34 are supported by the main chassis frame, yet the connection between the parts is such that they will operate freely in any position which the auxiliary frames may assume relative to each other.

As the clutch is used the friction surfaces thereon are apt to become worn so that a greater rocking movement of the actuator 13 is required to cause the clutch to be engaged. In order that any wear in the clutch may not affect the operation of the interlocking mechanism above described, I propose to adjustably connect the arms 40, 44 to the rock-shaft 13. This is herein accomplished by providing said rock-shaft with a projection or short arm 61 to which the arm 40 is pivotally connected at 62, said arm 61 having a portion to overlie a portion of the arm 40. A clamping screw or clamping screws 53 carried by the arm 40 engage in slots 54 formed in the overlapping portion of the arm 61, and by this arrangement the angular position of the arm 40 relative to the rock-shaft 13 may be adjusted. The same construction is adopted for connecting the arm 44 to the rock-shaft 13. Said arms can be kept in proper adjustment as wear occurs in the clutch.

I have not described herein all embodiments of my invention, but have illustrated a selected embodiment only which is sufficient to show the principle of the invention.

Having fully described my invention, what I claim as new and desire to secure by Letters Patent is:—

1. In an automobile, the combination with a main driving clutch, of a sliding brake actuator having a main and an auxiliary notch, the latter of less depth than the former, and a clutch actuator having an arm provided with a projection to engage said notches whereby movement of the actuator to carry the projection from the main to the auxiliary notch will release the clutch.

2. In an automobile, the combination with a main driving clutch, of a sliding brake actuator having in its upper face a main and an auxiliary notch, the latter of less depth than the former, and also having an extended flat surface adjacent the auxiliary notch, a clutch actuator having an arm provided with a projection to rest on the upper face of the actuator, said notches having such an arrangement relative to each other that movement of the actuator to carry the projection from the main to the auxiliary notch will release the clutch but will not apply the brake, and further movement to carry the projection onto the flat surface will apply the brake.

3. In an automobile, the combination with a spring-controlled driving clutch, of a clutch actuator having an arm, a slidable actuator for operating the brake, which actuator engages said arm and is provided with a low portion which is connected by an inclined surface with a straight portion extending substantially parallel to the direction of movement of said actuator whereby movement of the actuator will cause the arm to engage the inclined portion thereby disengaging the clutch, while further movement of said brake actuator will carry the straight portion under said arm so that the strain of the clutch spring will be taken by said brake actuator, but will not affect its ease of movement.

4. In an automobile, the combination with a spring-controlled driving clutch, of a slidable actuator for operating the brake, a rock shaft for disengaging the clutch, an arm rigid with the rock shaft and carrying a projection, said actuator having a notch to receive said projection when the clutch is engaged and a straight surface extending parallel to the direction of movement of the actuator adjacent said notch whereby movement of the actuator will force the projection out of the notch thereby disengaging the clutch and further movement of the actuator will carry said straight portion under said projection so that the strain of the clutch spring will be taken by the actuator but will not affect its ease of movement.

5. In an automobile, the combination with a spring-controlled main driving clutch, of an actuator for disengaging the clutch, a sliding actuator for setting a brake, and means to disengage the clutch against the action of the spring by the initial movement of said brake actuator which is insufficient to set the brake, said latter actuator being adapted to take the strain of the spring during such further movement thereof as is necessary to set the brake.

In testimony whereof, I have signed my name to this specification, in the presence of two subscribing witnesses.

JOHN ECKHARD.

Witnesses:
  LOUIS C. SMITH,
  THOMAS J. DRUMMOND.